United States Patent [19]

Madhavapeddy et al.

[11] Patent Number: 5,737,702
[45] Date of Patent: Apr. 7, 1998

[54] CELLULAR RADIO COMMUNICATIONS SYSTEM

[75] Inventors: Seshagiri Rao Madhavapeddy, Richardson; Udaya Sankar Kotamarti, Garland, both of Tex.

[73] Assignee: Northern Telecom Limited, Montreal, Canada

[21] Appl. No.: 401,083

[22] Filed: Mar. 8, 1995

[51] Int. Cl.[6] .................................... H04Q 7/00
[52] U.S. Cl. .................. 455/422; 455/455; 455/517; 455/524
[58] Field of Search ................. 455/33.1, 33.2, 455/33.4, 34.1, 34.2, 53.1, 54.1, 54.2, 56.1, 422, 434, 435, 436, 443, 446, 450, 455, 507, 509, 517, 514, 524, 516, 100–101, 103–105, 113–115, 117; 379/59, 60, 104–105; 370/338

[56] References Cited

U.S. PATENT DOCUMENTS

| | | | |
|---|---|---|---|
| 4,876,738 | 10/1989 | Selby | 455/54.1 |
| 5,212,822 | 5/1993 | Fukumine et al. | 455/33.1 |
| 5,276,905 | 1/1994 | Hurst et al. | 455/62 |
| 5,361,396 | 11/1994 | Onoue et al. | 455/33.4 |
| 5,564,072 | 10/1996 | Aguilera et al. | 455/422 |
| 5,633,873 | 5/1997 | Kay et al. | 455/450 |

FOREIGN PATENT DOCUMENTS

| | | | |
|---|---|---|---|
| 0260763 | 3/1988 | European Pat. Off. | |
| 0382309 | 8/1990 | European Pat. Off. | |
| 0505106 | 9/1992 | European Pat. Off. | 455/33.1 |
| 0593298 | 4/1994 | European Pat. Off. | |
| 9221215 | 11/1992 | WIPO | |

*Primary Examiner*—Reinhard J. Eisenzopf
*Assistant Examiner*—Doris To
*Attorney, Agent, or Firm*—Lee, Mann, Smith, McWilliams, Sweeney & Ohlson

[57] ABSTRACT

A cellular communications system serves fixed access subscriber terminals each located in a system cell defined as the home cell for that terminal. Each subscriber terminal is allocated a super home cell comprising the home cell itself together with a number of cells adjacent thereto. System transactions, e.g. access, paging and hand off, relating to a terminal may be conducted in any one of the cells comprising the super home cell group.

7 Claims, 5 Drawing Sheets

CELLULAR RADIO COMMUNICATIONS SYSTEM

This invention relates to fixed access cellular communications systems, and in particular to apparatus and methods for effecting access, paging and hand-off of subscribers in such a system.

BACKGROUND OF THE INVENTION

A recent development in cellular radio communications has been the introduction of fixed access systems. In such a system each subscriber communicates with a local base station via a fixed antenna which usually has directional properties. A particular application of such a system is the replacement of the conventional wired subscriber loop in the provision of a public or private telecommunications system. In North America, fixed access systems operate in the 400 MHz and 800 MHz bands The signal propagation in both these bands has similar characteristics. Typically the mean path loss is between 30 dB/dcc to 40 dB/cc depending on whether the terrain is flat, hilly or mountainous and whether the environment is rural, suburban or urban. The fluctuation in the signal strength due to terrain variations, (slow, fading or log normal fading) causes the signal strength to have a log normal distribution about the mean with a standard deviation of about 8 dB. Moreover, fast fading (Rayleigh fading, multipath fading), imposes a Rayleigh distribution on the signal strength. The signal fluctuates in a range of about 40 dB, between +10 dB to −30 dB from the mean. This fast fading is due to standing waves and occurs over distances of about a wavelength.

Since the signal strength at any point in the coverage area is difficult to predict due to the random components introduced by slow and fast fading, a statistical approach is taken for provisioning acceptable service over the coverage area. Cellular systems with mobility are usually designed so that acceptable service is provided over 95% of the coverage area. It is assumed that since the terminal is fast moving, it would pass in and out of fades quickly and since the signal strength would be acceptable 95% of the time, the overall grade of service is generally considered to be acceptable to system users. In a fixed cellular system however, the terminals in the system are non-moving and it therefore cannot be assumed that they would be capable of moving out of fades quickly. Hence designing a system for an expected 95% coverage may not deliver an acceptable quality of service for some subscribers and it is generally considered necessary to design a fixed access system to provide 99% coverage.

Since the terminals in a fixed cellular system are stationary, it is possible to define a "home cell" for each terminal. The home cell is simply the cell inside whose physical boundaries the terminal resides. However, one cannot guarantee that the terminal will always lock on to the control channel or PACH of the home cell only. This is due to the fact that the terminals from time to time scan the channel set and lock on to the one that they receive at the highest strength at that time. Thus, a terminal, although physically present in its home cell, may lock on to the control channel of an adjacent cell due to temporal changes in RF propagation. This occurrence may be quite common for those terminals on or near a cell boundary. However, it can occur even for terminals in cell interiors This effect can cause rejection of a request for service or failure to terminate a call as the terminal is locked on to the control channel of the wrong cell. This can result in an unacceptable quality of service to the customer.

The conventional approach to this problem is to increase the transmitter power of the base stations serving the cells and/or to provide any subscriber located in fade areas with a high gain antenna. The former option may be precluded by local or national broadcasting regulations, while the latter option involves additional expense for the service provider.

OBJECT OF THE INVENTION

The object of the invention is to minimise or to overcome the above disadvantage.

Another object of the invention is to provide improved access, paging and hand-off procedures in a fixed access communications system. A further object of the invention is to provide an improved fixed access communications system.

SUMMARY OF THE INVENTION

According to one aspect of the invention there is provided a cellular communications system serving fixed subscriber terminals each of which is located in a respective home cell, wherein each said subscriber terminal is allocated a super home cell comprising the home cell in which that subscriber terminal is located together with one or more cells adjacent thereto, and wherein system transactions relating to a said fixed subscriber terminal are performed in any one cell of the group of cells comprising the super home cell of that terminal.

According to another aspect of the invention there is provided a cellular communications system serving fixed subscriber terminals each of which is located in a respective home cell, the system including base stations one for each said cell, base station controllers each controlling a group of said base stations, and a switching centre to which the base stations are coupled and whereby the system is controlled, there being a database associated with the switching centre, wherein each system cell is allocated a respective address, wherein each subscriber is allocated a super home cell comprising the home cell in which that subscriber terminal is located together with one or more cells adjacent thereto, wherein for each said subscriber terminal a list of the addresses of those cells constituting the super home cell of that subscriber terminal is stored in the database, and wherein, for every system transaction involving a said subscriber terminal the switching centre is adapted to retrieve from the database the address list of the cells constituting the home cell of that subscriber terminal whereby to perform the transaction in one of the listed cells.

By allowing transactions involving a subscriber terminal to be performed in a cell other than the terminal's home cell, the probability of completing that transaction is increased and the quality of service provided to the subscriber is thus improved.

BRIEF DESCRIPTION OF THE DRAWINGS

An embodiment of the invention will now be described with reference to the accompanying drawings in which.

DESCRIPTION OF PREFERRED EMBODIMENT

Figure 1:
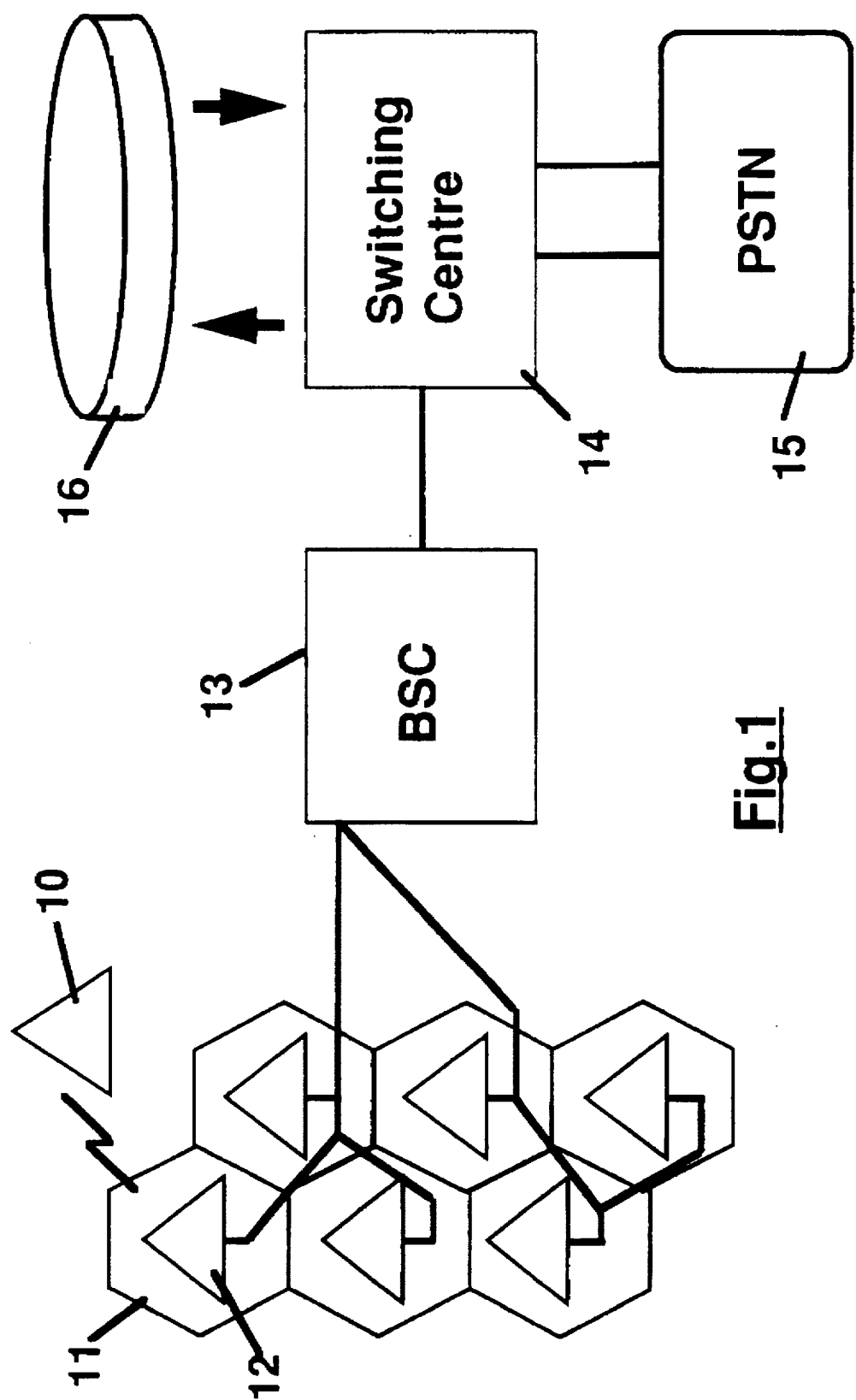
FIG. 1 is a schematic diagram of a cellular communications network accommodating fixed access subscriber terminals.

Referring to FIG. 1, there is depicted in highly schematic form part of a fixed access cellular communications network or system. The service area of the system is subdivided into a plurality of contiguous cells 11 in each of which cells subscriber terminals 10 are serviced via a respective base station 12. Operation of a group of base stations 12 is controlled via a base station controller 13 and, in turn, a number of base station controllers are serviced by a switching centre 14 which centre has a control function and may also provide an interface to the public telecommunications network 15. Each system cell is allocated a respective address. Information relating to the subscriber terminals 10 may be stored in a database 16 associated with the switching centre. In the system of FIG. 1, each terminal 10 is allocated a super home cell comprising the cell 11 in which it is located together with some or all of the cells immediately adjacent that cell. In some circumstances, e.g. where the terminal is located close to a cell boundary, one or more cells not immediately adjacent the home cell may also be included in the super home cell group of cells. In the system of FIG. 1, a service request or a paging response originating from a terminal within its super home cell are processed while all service requests and paging responses relating to that terminal and originating outside the super home cell are refused or ignored.

Figure 2:
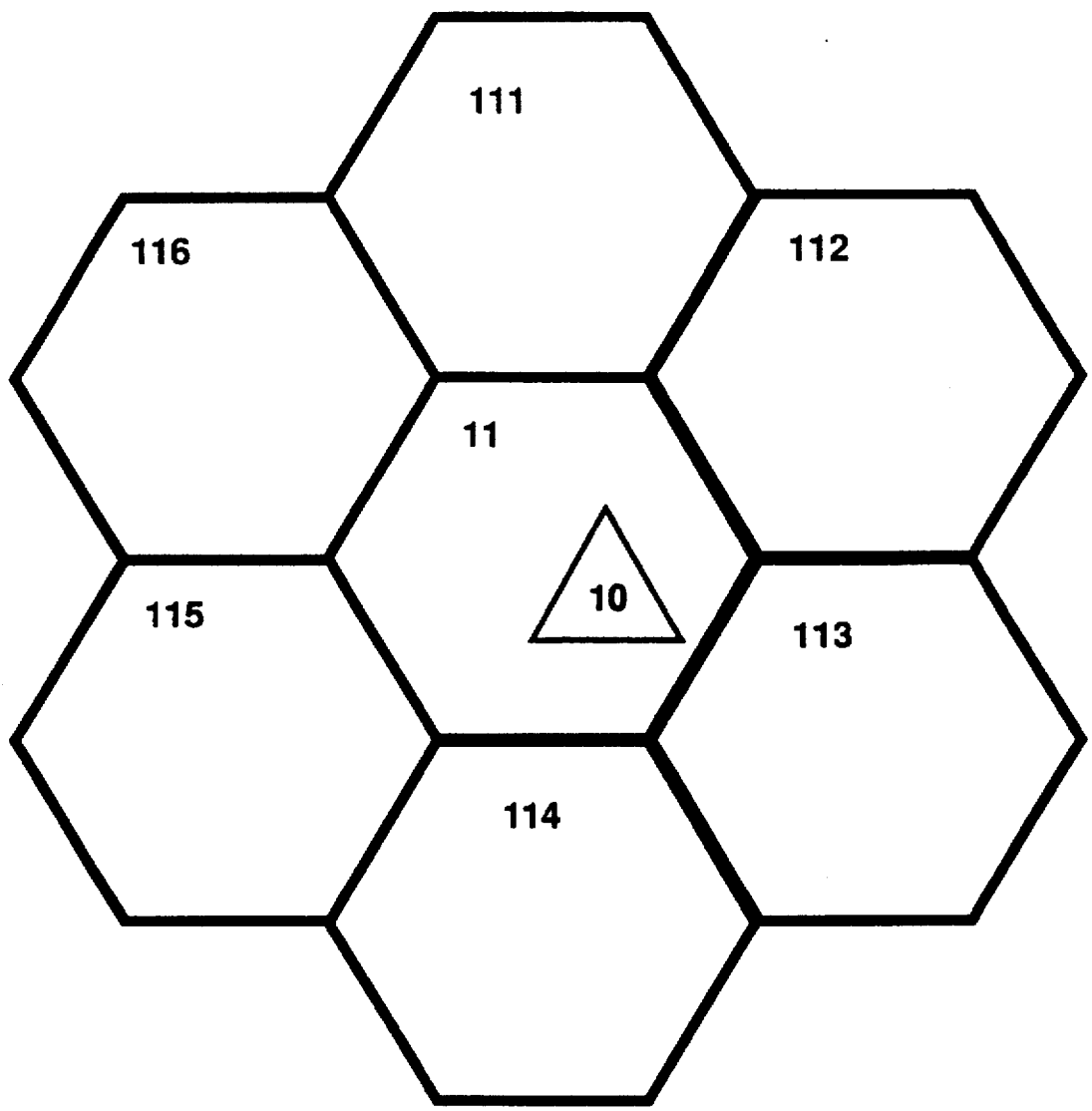
FIG. 2 shows part of the network of FIG. 1 illustrating the definition of a super home cell for a subscriber terminal.

FIG. 2 shows a typical allocation of a super home cell to a fixed subscriber terminal in more detail. The fixed terminal 10 is physically located in its home cell 11 but, as described above, may access the control channel of an adjacent cell 111 to 116. The set of cells which may be accessed by the terminal are defined as the super home cell for that terminal. It will be appreciated that, either because of local propagation conditions or because of the particular siting of the terminal, the super home cell may exclude one or more of the immediately adjacent cells and/or may include cells that are not immediately adjacent to the home cell. It will also be appreciated that the super home cell groups for the subscriber terminals located within a particular cell need not all be identical.

Figure 3:
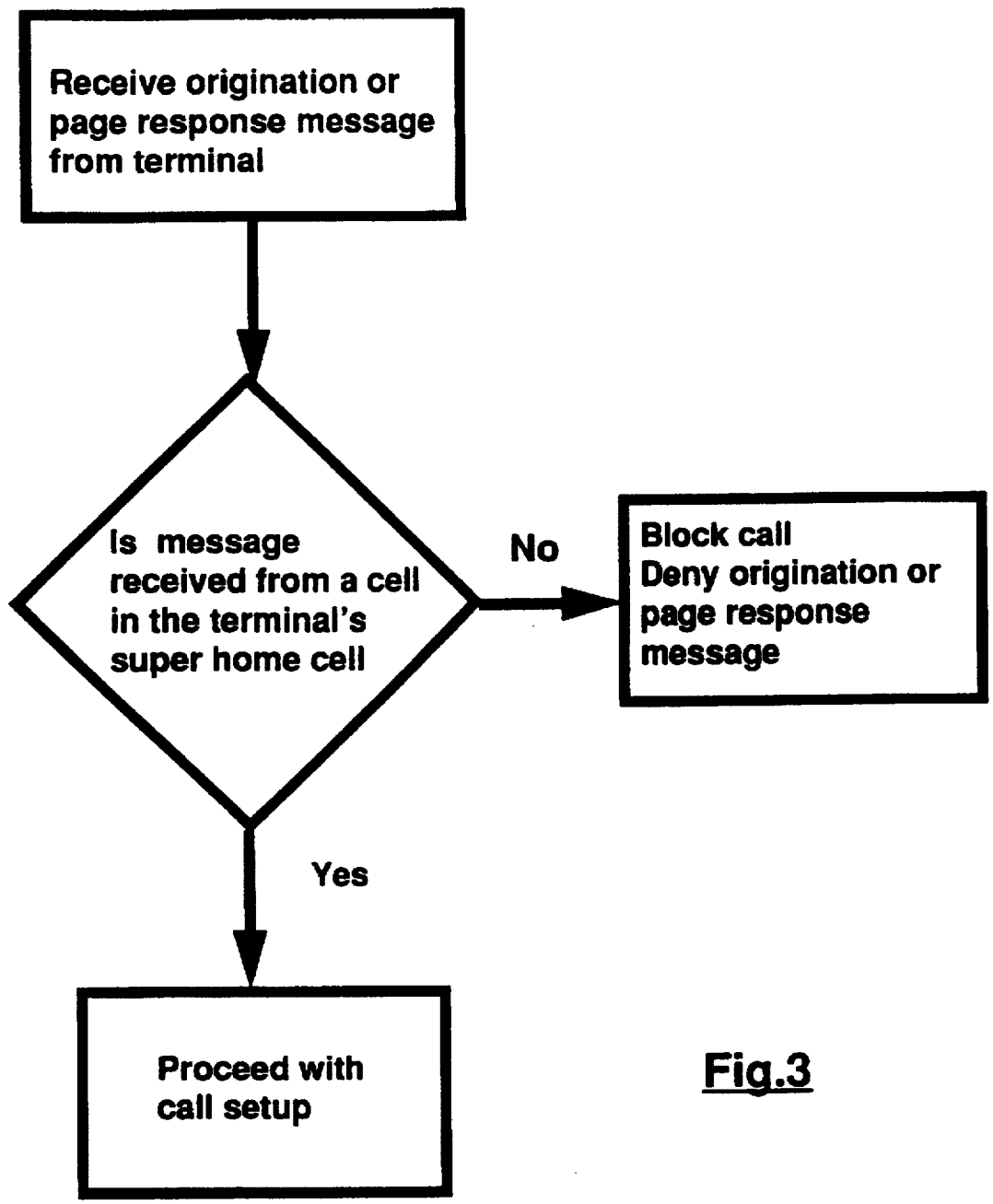
FIGS. 3, 4 and 5 are flow charts illustrating access, paging and hand-off algorithms used in the operation of the system of FIGS. 1 and 2.

There now follows a description of the processes employed to effect access of terminals to the system, paging of terminals to set up calls thereto, and handing off of completed calls. These processes will be described with reference to the flow charts of FIGS. 3, 4 and 5.

Access

In our system described above, terminals are allowed call origination and termination capability not only from the home cell 11 itself, but also from some or all of those cells 111 to 116, designated as adjacent the home cell. This set of cells comprises the fixed terminal's super home cell. A suitable terminal access sequence is illustrated in the flow chart of FIG. 3. The addresses of those cells which are adjacent the home cell of a fixed terminal may be stored in a look up table, where each row corresponds to a home cell and the entries are all the cells that are adjacent the home cell. We refer to this table as ADJCELL. If a fixed terminal tries to originate from any other cell in the system, i.e. from a cell not contained in the super home cell, its request for service is rejected. Likewise, if a terminal transmits a page response from a cell not included in the super home cell, that response is ignored. Typically the table ADJCELL will be stored in the database 16 (FIG. 1) accessible by the switching centre.

Paging

Similarly, we cannot simply page only the home cell of a terminal to set up a call to that terminal because, at the time of paging, the terminal may have locked on to the control channel of an adjacent cell within the super home cell group.

Figure 4:
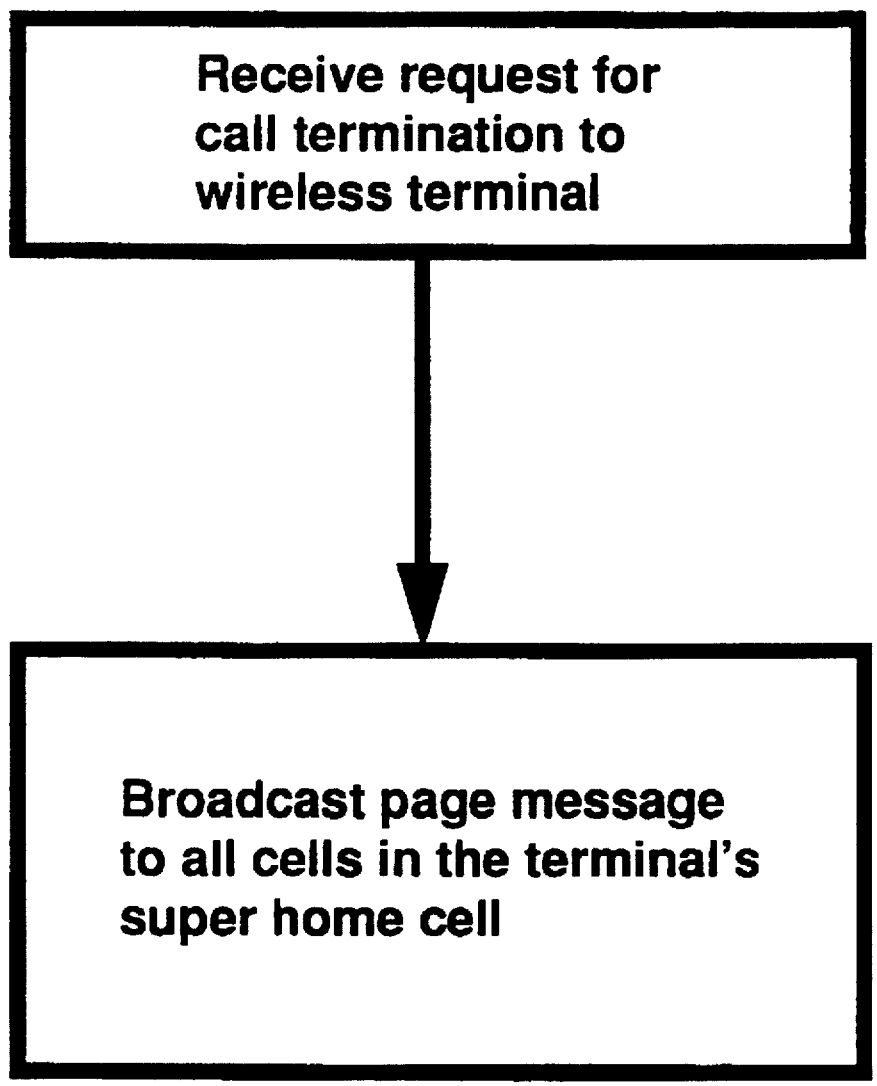
Figure 5:
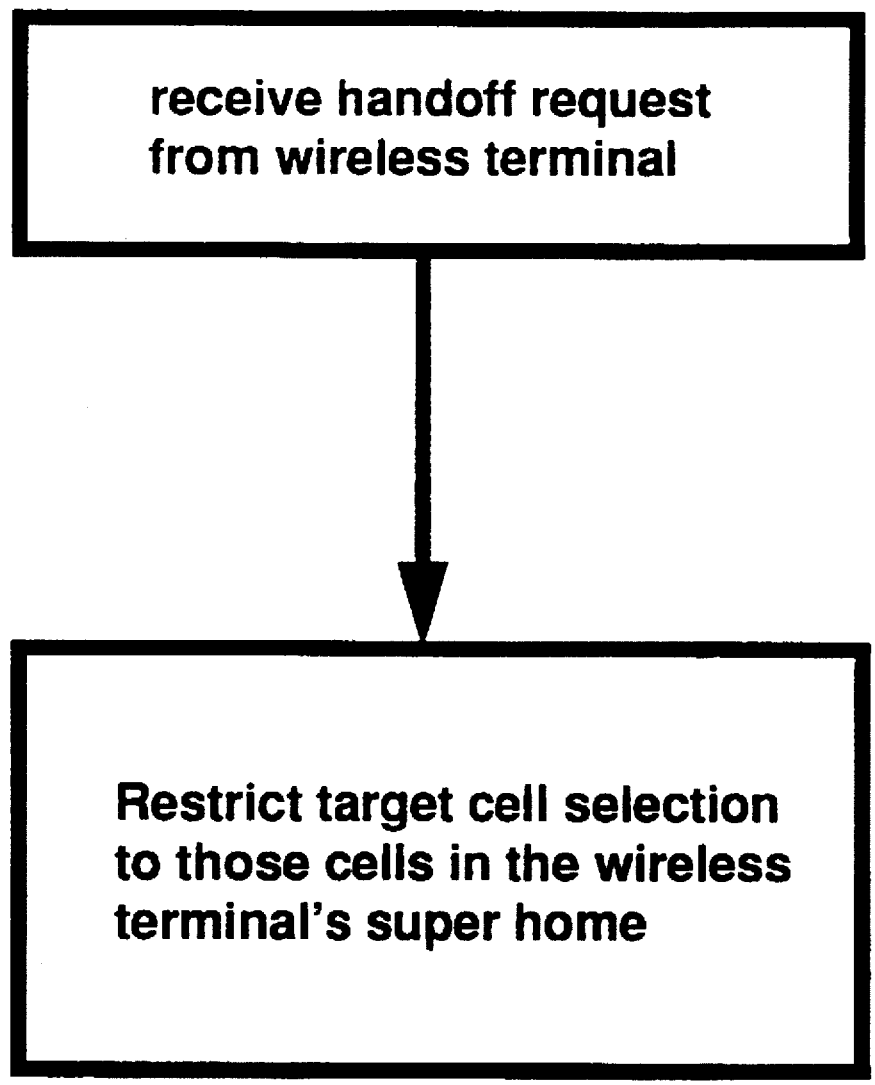

To address this situation, the page message is broadcast over the super home cell, i.e., over the control channel of the home cell, as well as the control channel of all the cells constituting that super home cell group (from table ADJCELL). If a fixed terminal's page response is received from any other cell in the system, i.e. from a cell not within the super home cell group, it is rejected. The paging process is illustrated in FIG. 4 of the accompanying drawings.

Hand-off

Since the terminals in fixed cellular are stationary, it may seem that one can simply block all hand-off requests from such terminals at the radio itself, thus conserving messaging and capacity. However, the signal quality in the cellular environment may degrade over time even for stationary terminals. This could happen due to temporal changes in the signal strength due to temporary obstruction e.g. by large trucks etc., or due to co-channel interference caused by a call set up in another cell, or external noise. If hand-off for stationary terminals were to be completely blocked, this could cause such calls to be dropped, leading to an unsatisfactory grade of service.

If full hand-off functionality were to be maintained, then it could also mean that, once a call is initiated, the fixed terminal would be allowed full mobility in the system. In the present system that possibility is prevented by allowing hand-offs only into a cell of the super home cell group of the fixed terminal, the hand-off sequence being illustrated in the flow chart of FIG. 5. When a hand-off request is initiated, only those cells appearing in the ADJCELL list are permitted to be possible target cells for the hand-off. Hand-off to any other cell not in the home cell group is refused.

It will be understood that although the cellular communications system has been described above only with reference to fixed access subscriber terminals, the system may of course form part of a hybrid system which also accommodates mobile subscriber terminals.

We claim:

1. A fixed access cellular communications system serving fixed subscriber terminals, each of which is permanently located in a respective home cell, via a respective base station disposed in that home cell, wherein each fixed subscriber terminal is allocated a super home cell comprising the home cell in which that fixed subscriber terminal is permanently located together with one or more cells adjacent thereto, wherein setting up of calls to and from said fixed subscriber terminal is effected via any one cell of the super home cell of that fixed subscriber terminal via the respective base station located in that one cell, and wherein setting up of calls to and from said fixed subscriber terminal via the base station of any cell located outside the super home cell of that fixed subscriber terminal is prohibited.

2. A fixed access cellular communications system as claimed in claim 1, wherein each said cell is allocated a respective system address, and wherein database means are provided for storing for each said fixed subscriber terminal a list of the addresses of those cells constituting the super home cell of that fixed subscriber terminal.

3. A fixed access cellular communications system as claimed in claim 2, and incorporating means for broadcasting paging messages to said fixed subscriber terminal over all the cells constituting the super home cell of that fixed subscriber terminal.

4. A fixed access cellular communications system serving fixed subscriber terminals, each of which is permanently located in a respective home cell, via a respective base station disposed in that home cell, the system including base station controllers each controlling a respective group of base stations, a switching center to which the base station controllers are coupled and whereby the system is controlled, and a database associated with the switching center, wherein each system cell is allocated a respective system address, wherein each said fixed subscriber terminal is allocated a respective super home cell comprising the cell in which that fixed subscriber terminal is permanently located together with one or more cells adjacent thereto, wherein for each said fixed subscriber terminal a list of the system addresses of those cells constituting the super home cell of that fixed subscriber terminal is stored in the database, wherein, for every system transaction involving a said fixed subscriber terminal, the switching center is adapted to retrieve from the database the list of the cells constituting the super home cell of that fixed subscriber terminal so as to perform the transaction in one of those listed cells, and wherein the system has means for prohibiting system transactions with said fixed subscriber terminal via a base station located in a cell outside the super home cell of that fixed subscriber terminal.

5. A method of operating a fixed access cellular communications system serving fixed subscriber terminals, each of which is permanently located in a respective home cell, via a respective base station disposed in that home cell, the method comprising allocating to each fixed subscriber terminal a super home cell comprising the home cell in which that fixed subscriber terminal is permanently located together with one or more cells adjacent thereto, setting up calls to and from each said fixed subscriber terminal via any one cell of the super home cell of that fixed terminal via the respective base station located in that one cell, and prohibiting the setting up of calls to and from said fixed subscriber terminal via the base station of any cell located outside the super home cell of that fixed subscriber terminal.

6. A method as claimed in claim 5, wherein each said cell is allocated a respective system address, wherein a list of the addresses of those cells constituting the super home cell of said fixed subscriber terminal is stored in a database, and wherein, for each attempt to set up a call to or from that fixed subscriber terminal the address list is retrieved from the database so as to determine whether the call set up attempt is being made via a base station located within that fixed subscriber's super home cell.

7. A method as claimed in claim 6, wherein paging messages for setting up calls to said fixed subscriber terminal are broadcast over all the cells constituting the super home cell of that fixed subscriber terminal.

\* \* \* \* \*